April 21, 1931.　　O. A. FREDERICKSON　　1,801,549
ANTISHORT BUSHING

Filed Aug. 16, 1929

Inventor
Otto A. Frederickson
By his Attorneys
Cooper, Kerr & Dunham

Patented Apr. 21, 1931

1,801,549

UNITED STATES PATENT OFFICE

OTTO ARTHUR FREDERICKSON, OF BEN AVON, PENNSYLVANIA, ASSIGNOR TO NATIONAL ELECTRIC PRODUCTS CORPORATION, OF NEW YORK, N. Y., A CORPORATION OF DELAWARE

ANTISHORT BUSHING

Application filed August 16, 1929. Serial No. 386,390.

This invention relates to improvements in insulating or anti-short bushings for use in electrical distribution systems.

One object of the present invention resides in the provision of a bushing of a particular configuration which is adapted to protect the insulated wire or cable against abrasion from the end of a metallic conduit into which the bushing is inserted. The metallic conduit may be either of the flexible armored type or of the rigid type.

A further object of the present invention resides in the provision of an insulating bushing of special configuration so that it may be readily inserted in position in the end of a conduit and so that it will thereafter grip the interior of the conduit and retain itself in position therein.

A further object of the present invention resides in the provision of an anti-short bushing having a tapered configuration upon its shank portion and with overlapping marginal edge portions adapted to close a partially open slot in one side of the shank portion when the bushing is inserted in position in the end of a conduit.

Further and other objects of the present invention will be hereinafter set forth in the accompanying specification and claims and shown in the drawings, which by way of illustration show preferred embodiments of the invention.

In more detail the anti-short bushing shown in each of the embodiments is made of flexible yielding insulating material. A suitable material which may be employed is sheet fibre which has the desired characteristics of resiliency. Each bushing at its end is provided with a curved over lip portion 10 adapted to extend over the end of the flexible armored conduit 11 or over the end of a rigid conduit 11a. This curved lip configuration provides a rounded end for the anti-short bushing and effectually prevents shorting or damage to the insulated wire or cable from the sharp end of the respective conduits.

Figure 2:
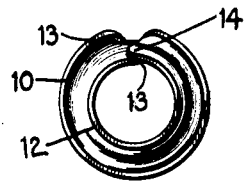
Fig. 2 is an end view of the bushing shown in Fig. 1 and looking from the bottom of said bushing.
Figure 3:
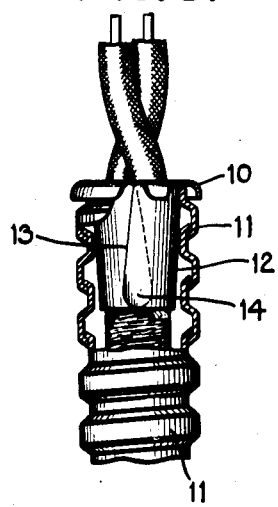
Fig. 3 shows the bushing of Fig. 1 in position in a flexible armored cable.

In order to provide for the retention of the anti-short bushing in the armored flexible conduit and in the rigid conduit the shank portions of all of the bushings are made tapering. Preferably for use in flexible armored cable the tapered portion of the bushing shank is made to taper away and decrease in diameter from the curved lip towards the other end of the bushing. This particular taper is indicated at 12 in Figs. 1 and 3. The decreasing taper also has an additional function which will be hereinafter set forth. Preferably with the form of bushing shown in Figs. 1 to 3 inclusive, the edge portions 13, before the bushing is inserted in the conduit, overlap slightly as indicated at 14. When the bushing is inserted in the flexible armor, the overlap is extended as is shown in Fig. 3 to completely close up the previously partially open longitudinal slot in the bushing. It will be understood that when the bushing is inserted in position, it is contracted somewhat and thereafter its own inherent resiliency retains it in position. The tapering configuration not only facilitates the introduction of the anti-short bushing into the flexible cable but this tapering construction also cooperates to provide the overlapping effect and it also acts to secure the bushing in position.

Preferably but not necessarily, the anti-short bushing is modified in configuration when intended for use in a rigid conduit. The lip like end 10 is retained but in lieu of the taper decreasing towards the opposite end of the bushing, such taper is made to increase as shown at 12a in Fig. 4. This construction provides for the resilient retention of the bushing in the rigid conduit and also makes the bushing at its inner end snugly fit the interior of the conduit thereby facilitating the fishing of insulating wires or cables out of the conduit and through the bushing. Preferably but not necessarily the taper is such and the disposition of the marginal edges 13a are such that the initially open longitudinal slot 15 substantially completely closes up so that the edges 13a abut each other when the bushing is introduced in position in the conduit. This relation of the parts is shown in Fig. 5.

Figure 4:
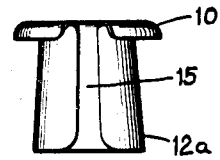
Fig. 4 shows another special form of bushing incorporating certain features of the bushing shown in Fig. 1, but in certain respects modified to make the same more suitable for use in a rigid conduit.
Figure 5:
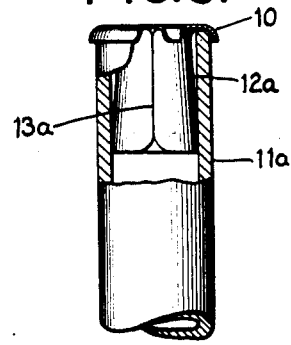
Fig. 5 shows the bushing of Fig. 4 inserted in the end of a section of rigid conduit.
Figure 6:
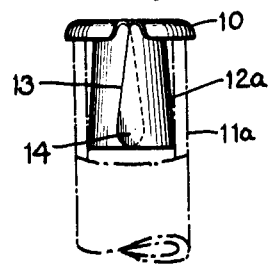
Fig. 6 shows a bushing for rigid conduit incorporating certain additional features which are embodied in the bushing which is shown in Fig. 1.

It will be noted that in the embodiment of the invention shown in Figs. 4 and 5 that there is no marginal overlap of the bushing material. However, such marginal overlap may be provided if it is desired to form a complete and overlapped closure for the initially open slot 15. A construction of bushing which provides such overlap is shown in Fig. 6. It may be mentioned, however, that where an overlap occurs with an anti-short bushing installed in a rigid conduit that there is an additional shoulder which may somewhat obstruct or hinder the fishing of an insulated wire from the conduit through the bushing. Accordingly, with rigid conduit installations the bushing without overlap may in certain instances be the preferable construction. When anti-short bushings are used with flexible or armored conduit the fishing operation is not employed inasmuch as the bushing is threaded or passed over the ends of the wires and into the end of the flexible armor. Accordingly, with such applications the overlapping arrangement is preferable. The decreasing taper which is shown on the embodiment of the invention illustrated in Figs. 1 to 3 also is particularly desirable with flexible armored cable applications because it facilitates the introduction of the bushing into position within the flexible armor inasmuch as the relatively small end clears the shoulders of the armor and obviates undesired sticking and catching. With rigid conduit on the contrary there is a smooth interior free from shoulders and accordingly the decreasing taper is not necessary and in fact it is preferable to have the taper an increasing one for reasons heretofore pointed out. In either case, however, the tapered configuration irrespective of the direction of taper, provides for a tight wedging and retention of the bushing in position.

Figure 1:
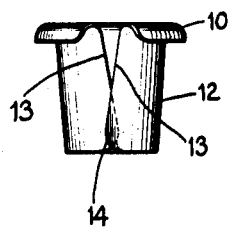
Figure 1 shows an anti-short bushing of a configuration which is particularly adapted for use with flexible armored cable or conduit.

By the term "conduit" as heretofore used broadly in the claims I mean to refer broadly to either a flexible armored conduit or a rigid conduit. The term "tapered shank" is intended to refer broadly to either the diminishing tapered configuration of the shank which is shown in Fig. 1 or to the increasing taper of the shank portion which is shown in Fig. 4.

What I claim is:

1. An anti-short bushing adapted for insertion in the end of a conduit formed of flexible yielding fibrous material and provided with a curved over lip at one end thereof for the purpose described.

2. An anti-short bushing adapted for insertion in the end of a conduit formed of flexible yielding fibrous material and having a tapered shank portion.

3. An anti-short bushing adapted for insertion in the end of a conduit and formed of flexible yielding fibrous material having one end portion provided with a curved over lip and having a tapered shank portion.

4. An anti-short bushing adapted for insertion in the end of a conduit, said bushing being flexible so as to yield and interiorly grip the conduit into which it is inserted, and said bushing being provided with a tapered shank portion.

5. An anti-short bushing adapted for insertion in the end of a conduit, said bushing being flexible so as to yield and interiorly grip the conduit into which it is inserted, and said bushing having a shank portion with overlapping marginal edge portions adapted to further overlap upon contracting the bushing when the latter is inserted in a conduit.

6. An anti-short bushing adapted for insertion in the end of a conduit, said bushing being flexible so as to yield when inserted in the end of a conduit and having edge portions which relatively close up upon contraction of the bushing, and which bushing has a tapered shank portion for the purpose described.

7. An anti-short bushing adapted for insertion in the end of a conduit, said bushing being formed of flexible sheet insulating material so as to yield when inserted in the conduit and to afterwards expand to grip the conduit, said bushing having a tapering shank portion which is longitudinally open and provided with marginal edges adapted to overlap to a greater extent when inserted in a conduit.

In testimony whereof I hereto affix my signature.

OTTO ARTHUR FREDERICKSON.

DISCLAIMER 1,801,549.—*Otto Arthur Frederickson*, Ben Avon, Pa. ANTISHORT BUSHING. Patent dated April 21, 1931. Disclaimer filed December 8, 1932, by the patentee, the assignee, *National Electric Products Corporation* acquiescing.

Hereby enters this disclaimer to that part of the claim in said Letters Patent which is in the following words, to wit: claims numbered 1, 2, 3 and 7, said claims reading as follows:

"1. An anti-short bushing adapted for insertion in the end of a conduit formed of flexible yielding fibrous material and provided with a curved over lip at one end thereof for the purpose described.

"2. An anti-short bushing adapted for insertion in the end of a conduit formed of flexible yielding fibrous material and having a tapered shank portion.

"3. An anti-short bushing adapted for insertion in the end of a conduit and formed of flexible yielding fibrous material having one end portion provided with a curved over lip and having a tapered shank portion."

"7. An anti-short bushing adapted for insertion in the end of a conduit, said bushing being formed of flexible sheet insulating material so as to yield when inserted in the conduit and to afterwards expand to grip the conduit, said bushing having a tapering shank portion which is longitudinally open and provided with marginal edges adapted to overlap to a greater extent when inserted in a conduit."

[*Official Gazette January 3, 1933.*]